3,297,767
UNSATURATED ETHER

Theodor Leidig and Götz Wustmann, Holzminden, Germany, assignors to Haarmann & Reimer G.m.b.H., Holzminden, Germany, a corporation of Germany
No Drawing. Filed June 11, 1963, Ser. No. 286,953
Claims priority, application Germany, June 12, 1962,
H 46,047
1 Claim. (Cl. 260—614)

This invention relates to novel odorous substances.

It has been found that bis-ethers of $\alpha,\beta$-unsaturated aliphatic alcohols with a chain comprising 7–12 carbon atoms are suitable as odorous substances. The new compounds used according to the invention have an unusual strength of odour for this size of molecule and at the same time also an exceptionally good adhesion power.

The compounds used according to the invention have the following general formula:

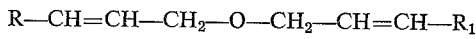

$$R-CH=CH-CH_2-O-CH_2-CH=CH-R_1$$

in which R and $R_1$ represent alkly radicals with 4–9 carbon atoms. The following compounds are mentioned as examples:

Bis-5-methyl-hex-2-en-1-ol ether,
B.P.$_{11}$: 119–124° C.; $D_4^{20}$: 0.820; $n_D^{20}$: 1.4468,
Bis-hept-2-en-1-ol ether (smells like orange peel),
B.P.$_{10}$: 127–131° C.; $D_4^{20}$: 0.826; $n_D^{20}$: 1.4500,
Bis-4-methyl-hept-2-en-1-ol ether (smell: fatty, like green core),
B.P.$_{10}$: 142–148° C.; $D_4^{20}$: 0.828; $n_D^{20}$: 1.4525,
Bis-oct-2-en-1-ol ether (has a strong odour of hempseed),
B.P.$_3$: 127–133° C.; $D_4^{20}$: 0.829; $n_D^{20}$: 1.4525,
Bis-non-2-en-1-ol ether (fragrance of unused linen),
B.P.$_5$: 161–166° C.,
Bis-4-ethyl-oct-2-en-1-ol ether (smell of egg shell and hemp),
B.P.$_2$: 149–156° C.; $D_4^{20}$: 0.831; $n_D^{20}$: 1.4533,
Bis-dec-2-en-1-ol ether (the smell reminiscent of fresh lard),
B.P.$_3$: 163–168° C.; $D_4^{20}$: 0.826; $n_D^{20}$: 1.4557,
Bis-undec-2-en-1-ol ether (smell: waxy, like blown-out candle),
B.P.$_3$: 196–203° C.; $D_4^{20}$: 0.832; $n_D^{20}$: 1.4563,
Bis-dodec-2-en-1-ol ether (smell: slightly of peach, like blown-out candle),
B.P.$_3$: 216–221° C.; $D_4^{20}$: 0.839; $n_D^{20}$: 1.4583.

The series has a culmination point in the bis-non-2-en-1-ol-ether, which has the characteristic odour of fresh and unused linen. When added to used articles made of linen, nettle cloth, cotton and the like, and after the washing thereof, it imparts the odour of brand-new, unworn linen, as sold in the shops. Once an article has been impregnated therewith, it keeps this fresh fragrance for months on end on being kept in the open air.

The compounds used according to the invention can for example be produced by heating 1-halogen-2-ene hydrocarbons, containing 7–12 carbon atoms in the molecule, in the presence of alkalis and in the presence of tertiary butanol. Examples of the 1-halogen-2-ene hydrocarbons are 1-chloro-2-octene, 1-chloro-2-nonene or 1-chloro-2-dodecene. The chlorine and bromine compounds are generally the most suitable as halogen compounds. Caustic potash or caustic soda can for example be used as alkalis. The reaction can for example be effected by gradually adding the unsaturated halogenated hydrocarbon to the mixture of alkali and tertiary butanol.

The new odorous substances can be used in the manner which is usual for such substances, optionally in admixture with other odorous components. When bis-non-2-en-1-ol ether is used as an odorous substance for linen, it is expedient to use aqueous emulsions which can also contain other constituents, e.g. synthetic resin dispersions. The new odorous compounds are used in usual amounts according to taste and the necessary amounts can be easily determined by experiments.

Example 1

A stable emulsion is prepared, as indicated below, from bis-non-2-en-1-ol ether by adding an emulsifier and a synthetic resin dispersion:

|  | Parts by wt. |
|---|---|
| Synthetic resin dispersion | 500 |
| Emulsifier | 25 |
| Water | 250 |
| Bis-non-2-en-1-ol ether | 225 |
| | 1000 |

The bis-non-2-en-1-ol ether was prepared in the following way:

A solution of n-hexyl magnesium chloride is produced from 240 g. of magnesium and 5 litres of diethyl ether with 1200 g. of n-hexyl chloride. The content of Mg-compound in the solution is titrated and 0.8 mol=45 g. of freshly distilled acrolein per 1 mol of Mg-compound is slowly added at 0° C. After being left to stand overnight, the substance is decomposed with ice-cold dilute acetic acid, washed until neutral and distilled in vacuo after evaporating the ether. 825 g.=78% of non-1-en-3-ol is obtained at 88–92° C./10 mm., with the following constants: $D_4^{20}$: 0.836; $n_D^{20}$: 1.4404.

142 g. of non-1-en-3-ol and 1 litre of concentrated hydrochloric acid are mixed and thoroughly stirred for 8 hours at 70° C. The 1-chloro-2-nonene which is formed is extracted by shaking with methylene chloride, washed neutral with sodium bicarbonate solution and distilled after evaporating the methylene chloride.

B.P.$_{12}$: 71–79° C.; $D_4^{20}$: 0.878; $n_D^{20}$: 1.4483%; Cl, 20.52 (theoretical 22.05),
Yield: 148 g.=92.5% of the theoretical,
Residue: 16 g.

100 g. of caustic potash powder are introduced while stirring into 200 g. of tert.-butanol. The mixture is heated to boiling point and 160 g. of 1-chloro-2-nonene are added dropwise while stirring vigorously and boiling. After boiling for 8 hours, a large part of the tert.-butanol is distilled off up to the internal temperature 100° C. The residue is diluted with water, washed and distilled and two fractions are obtained:

Fraction I: 64° C./5 mm.–161° C./5 mm. 74 g.
Fraction II: 161° C./5 mm.–166° C./5mm. 77 g.

Fraction I still contains 13.4% of Cl and can be used again after the 1-chloro-2-nonene has been removed by fractionation.

Fraction II is bis-non-2-en-1-ol-ether. Yield: 77 g.=58%.

The other compounds used according to the invention can be obtained in a corresponding manner.

Example 2

(a) From bis-non-2-en-1-ol ether and with the aid of an emulsifier mixture, a clear solution is produced which is stable:

|  | Parts by wt. |
|---|---|
| Bis-non-2-en-1-ol-ether | 200 |
| Emulsifier | 800 |
| | 1000 |

(b) The products described in Examples 1 and 2a can either be applied to the garments by a dipping process or spraying process. Using the dipping process, about 5–10 g. are added per litre of bath liquid.

Using a spraying process, the textiles can be sprayed with an aqueous dispersion of these products, which contain about 50 g. per litre of water.

It is expedient for this purpose to use a spray pistol with a very fine nozzle, so that a relatively dry mist is deposited on the textiles.

*Example 3*

A direct absorption of the bis-non-2-en-1-ol-ether on the garments is also possible in a vigorously moved dipping bath. For this purpose, an addition of 0.5–1 g. of bis-non-2-en-1-ol-ether per litre of bath liquid is sufficient in order to produce a strong and clinging fragrant effect on the treated garments.

The bis-oct-2-en-1-ol-ether can be prepared in a manner analogous to Example 1 from 1-bromo-2-octene, which can be obtained by way of the oct-1-en-3-ol (from n-amyl magnesium bromide and acrolein).

*Example 4*

Instead of the pure bis-non-2-en-1-ol-ether, it is also possible in Examples 1, 2a and 3 to use compositions with a varying content of bis-non-2-en-1-ol-ether, e.g.:

| | Percent |
|---|---|
| Bis-non-2-en-1-ol-ether | 10 |
| Formosa citronella oil | 20 |
| Safrol | 10 |
| Oil of lavender | 58 |
| Ambrette seed oil | 2 |

*Example 5*

The following method of application is mentioned as an example for the use of bis-oct-2-en-1-ol-ether:

| | Part by wt. |
|---|---|
| Bis-oct-2-en-1-ol-ether | 200 |
| Emulsifier | 800 |
| | 1000 |

Material which is processed into binding threads, ropes or cords is treated with this solution by the dipping or spraying process. The finished goods then have the smell of true hemp tow.

We claim:

Compound of the formula:

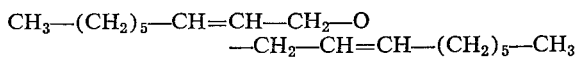

References Cited by the Examiner

UNITED STATES PATENTS 2,042,219    5/1936    Groll et al.

FOREIGN PATENTS 1,074,031    1/1960    Germany.

OTHER REFERENCES

Prevost, C.: Bull. Soc. Chim. 8 pp. 89–100 (1941).

LEON ZITVER, *Primary Examiner.*

H. T. MARS, *Assistant Examiner.*